US010554740B2

(12) United States Patent
Bailey et al.

(10) Patent No.: US 10,554,740 B2
(45) Date of Patent: *Feb. 4, 2020

(54) DYNAMIC ALLOCATION OF A WORKLOAD ACROSS A PLURALITY OF CLOUDS

(71) Applicant: International Business Machines Corporation, Armonk, NY (US)

(72) Inventors: Bret A. Bailey, Flower Mound, TX (US); Joseph E. Hackett, Fort Worth, TX (US); Leonard S. Hand, Red Creek, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1149 days.

This patent is subject to a terminal disclaimer.

(21) Appl. No.: 14/706,602

(22) Filed: May 7, 2015

(65) Prior Publication Data

US 2015/0244792 A1    Aug. 27, 2015

Related U.S. Application Data

(63) Continuation of application No. 13/441,526, filed on Apr. 6, 2012, now Pat. No. 9,086,929.

(51) Int. Cl.
*G06F 15/173* (2006.01)
*H04L 29/08* (2006.01)
(Continued)

(52) U.S. Cl.
CPC ........ *H04L 67/1025* (2013.01); *G06F 3/0482* (2013.01); *G06F 3/04842* (2013.01);
(Continued)

(58) Field of Classification Search
CPC ............... H04L 47/829; H04L 67/1002; H04L 67/1036; H04L 67/1008; H04L 41/5003; H04L 41/5029; H04W 41/003
(Continued)

(56) References Cited

U.S. PATENT DOCUMENTS 6,856,991 B1   2/2005  Srivastava
6,990,666 B2   6/2006  Hirschfeld et al.
(Continued)

FOREIGN PATENT DOCUMENTS

CN   102232282 A   11/2011
CN   103365725 A   10/2013
(Continued)

OTHER PUBLICATIONS

Vecchiola, C., et al., "Aneka: A Software Platform for .NET-based Cloud Computing," In High Speed and Large Scale Scientific Computing, IOS Press, 2009, 30 pgs.
(Continued)

*Primary Examiner* — Ario Etienne
*Assistant Examiner* — Sahera Halim
(74) *Attorney, Agent, or Firm* — Cuenot, Forsythe & Kim, LLC (57) ABSTRACT

A method of allocating cloud resources. A user interface can be presented to a user. The user interface can be configured to receive a user selection of a change of context for at least one of a plurality of workloads allocated to at least one cloud. Responsive to receiving the user selection of the change of context for the workload, via a processor, a service level agreement applicable to the workload can be dynamically changed from a first service level agreement to a second service level agreement, while the workload remains in an available state.

11 Claims, 9 Drawing Sheets

(51) Int. Cl.
*G06F 9/50* (2006.01)
*G06F 3/0482* (2013.01)
*G06F 3/0484* (2013.01)
*H04L 12/24* (2006.01)
*H04L 12/917* (2013.01)

(52) U.S. Cl.
CPC ........ *G06F 9/5072* (2013.01); *H04L 41/5003* (2013.01); *H04L 47/76* (2013.01); *H04L 41/5029* (2013.01); *H04L 67/1008* (2013.01)

(58) Field of Classification Search
USPC ........................................ 709/226, 223, 229
See application file for complete search history.

(56) References Cited

U.S. PATENT DOCUMENTS

| | | | |
|---|---|---|---|
| 7,406,691 | B2 | 7/2008 | Fellenstein et al. |
| 7,441,241 | B2 | 10/2008 | Dawson et al. |
| 7,472,079 | B2 | 12/2008 | Fellenstein et al. |
| 7,502,850 | B2 | 3/2009 | Fellenstein et al. |
| 7,562,143 | B2 | 7/2009 | Fellenstein et al. |
| 7,571,120 | B2 | 8/2009 | Fellenstein et al. |
| 7,574,496 | B2 | 8/2009 | McCrory et al. |
| 7,577,722 | B1* | 8/2009 | Khandekar ......... G06F 9/45558 709/220 |
| 7,590,623 | B2 | 9/2009 | Fellenstein et al. |
| 7,668,741 | B2 | 2/2010 | Ernest et al. |
| 7,712,100 | B2 | 5/2010 | Fellenstein et al. |
| 7,917,617 | B1* | 3/2011 | Ponnapur ............ G06F 9/45558 709/224 |
| 8,019,683 | B1* | 9/2011 | Swanburg ............ G06Q 20/102 370/259 |
| 8,589,940 | B2* | 11/2013 | Lim .................... G06F 9/45558 718/104 |
| 8,924,562 | B2* | 12/2014 | Sartini ..................... G06F 9/50 709/217 |
| 9,003,502 | B2* | 4/2015 | Zhang .................... G06F 21/31 726/5 |
| 9,071,613 | B2 | 6/2015 | Bailey et al. |
| 9,086,929 | B2 | 7/2015 | Bailey et al. |
| 9,442,771 | B2* | 9/2016 | Morgan ................ G06F 9/5072 |
| 9,563,479 | B2* | 2/2017 | Ferris .................... G06F 9/5072 |
| 2003/0105810 | A1 | 6/2003 | McCrory et al. |
| 2008/0256228 | A1 | 10/2008 | Fellenstein et al. |
| 2009/0216883 | A1 | 8/2009 | Fellenstein et al. |
| 2010/0125664 | A1 | 5/2010 | Hadar et al. |
| 2010/0223378 | A1 | 9/2010 | Wei |
| 2010/0268764 | A1 | 10/2010 | Wee et al. |
| 2010/0306354 | A1 | 12/2010 | DeHaan et al. |
| 2011/0016473 | A1 | 1/2011 | Srinivasan |
| 2011/0078303 | A1 | 3/2011 | Li et al. |
| 2011/0126168 | A1 | 5/2011 | Ilyayev |
| 2011/0126207 | A1 | 5/2011 | Wipfel et al. |
| 2011/0131309 | A1* | 6/2011 | Akiyama ................ H04L 12/14 709/223 |
| 2011/0131335 | A1 | 6/2011 | Spaltro et al. |
| 2011/0138047 | A1 | 6/2011 | Dawson et al. |
| 2011/0138049 | A1 | 6/2011 | Dawson et al. |
| 2011/0145392 | A1 | 6/2011 | Dawson et al. |
| 2011/0154318 | A1 | 6/2011 | Oshins et al. |
| 2011/0161947 | A1 | 6/2011 | Ashok et al. |
| 2011/0161952 | A1 | 6/2011 | Poddar et al. |
| 2011/0231552 | A1 | 9/2011 | Carter et al. |
| 2011/0258317 | A1* | 10/2011 | Sinha .................... H04L 41/12 709/226 |
| 2011/0282982 | A1 | 11/2011 | Jain |
| 2011/0296023 | A1 | 12/2011 | Ferris et al. |
| 2012/0179824 | A1* | 7/2012 | Jackson ................ G06F 9/5027 709/226 |
| 2012/0204176 | A1 | 8/2012 | Tian et al. |
| 2013/0024862 | A1* | 1/2013 | Lim .................... G06F 9/45558 718/1 |
| 2013/0080623 | A1 | 3/2013 | Thireault |
| 2013/0268674 | A1 | 10/2013 | Bailey et al. |
| 2013/0268861 | A1 | 10/2013 | Bailey et al. |
| 2015/0244646 | A1 | 8/2015 | Bailey et al. |

FOREIGN PATENT DOCUMENTS

| | | |
|---|---|---|
| CN | 104205056 A | 12/2014 |
| DE | 112013001889 T5 | 12/2014 |
| IN | 1787CHE2011 A | 6/2011 |
| WO | 2011091056 A1 | 7/2011 |
| WO | 20130149339 A1 | 10/2013 |

OTHER PUBLICATIONS

Creese et al., "Data Protection-Aware Design for Cloud Computing," White Paper, HP Laboratories, HPL-2009-192, Aug. 21, 2009, 13 pgs.
Cheng, G., et al., "Building Dynamic Integrity Protection for Multiple Independent Authorities in Virtualization-based Infrastructure," 2009 10th IEEE/ACM Int'l Conf. on Grid Computing, Oct. 13-15, 2009, 8 pgs.
Paton, N.W., et al., "Optimizing Utility in Cloud Computing through Autonomic Workload Execution," IEEE Data Eng. Bull., vol. 32, No. 1, 2009, 8 pgs.
"Exploiting the Cloud for Mission-Critical Workloads via the Hybrid Enterprise," Unisys, Whitepaper, 2011, 12 pgs.
Anonymous, "Dynamic Virtual Server Consolidation based on Network Traffic in Cloud Computing Environment," [online] IP.com Prior Art Database Disclosure, retrieved from the Internet: <http://priorartdatabase.com/ IPCOM000210401D>, Sep. 2, 2011, 10 pgs.
IBM, "Method of Creating a Componentized Architecture for Unifying Resource Sharing Scenarios in Cloud Computing Environment," [online] IP.com Prior Art Database Disclosure, retrieved from the Internet: <http://priorartdatabase.com/IPCOM000193146>, Feb. 11, 2010, 14 pgs.
Lin, J. et al., "VegaWarden: A Uniform User Management System for Cloud Applications," Proc. of the 2010 IEEE Int'l Conf. on Networking, Architecture, and Storage (NAS 2010), pp. 457-464, Jul. 15-17, 2010, 8 pgs.
WIPO PCT Appln. No. PCT/CA2013/050258, International Search Report, dated Jul. 30, 2013, 3 pg.
WIPO PCT Appln. No. PCT/CA2013/050258, International Preliminary Report on Patentability, dated Oct. 7, 2014.
U.S. Appl. No. 13/441,512, Non-Final Office Action, dated Dec. 5, 2013, 10 pg.
U.S. Appl. No. 13/441,512, Non-Final Office Action, dated Mar. 28, 2014, 10 pg.
U.S. Appl. No. 13/441,512, Final Office Action, dated Nov. 5, 2014, 10 pg.
U.S. Appl. No. 13/441,512, Notice of Allowance, dated Feb. 25, 2015, 17 pg.
U.S. Appl. No. 13/441,526, Non-Final Office Action, dated Jul. 31, 2014, 13 pg.
U.S. Appl. No. 13/441,526, Notice of Allowance, dated Mar. 12, 2015, 11 pg.

\* cited by examiner

┌─────────────────────────────┐
│ Present to a user a user interface │
│ configured to receive a user │
│ selection of a change of context for │
│ at least one of a plurality of │
│ workloads allocated to at least one │
│ cloud │
│                         802 │
└─────────────────────────────┘
              │
              ▼
┌─────────────────────────────┐
│ Responsive to receiving the user │
│ selection of the change of context │
│ for the workload, via a processor, │
│ dynamically change a service level │
│ agreement applicable to the │
│ workload from a first service level │
│ agreement to a second service level │
│ agreement, while the workload │
│ remains in an available state │
│                         804 │
└─────────────────────────────┘

┌─────────────────────────────┐
│ Present to a user a user interface │
│ configured to receive a user │
│ selection of a change of context for │
│ at least one of a plurality of │
│ workloads allocated to at least one │
│ cloud │
│                         902 │
└─────────────────────────────┘
              │
              ▼
┌─────────────────────────────┐
│ responsive to receiving the user │
│ selection of the change of context │
│ for the workload, via a processor, │
│ dynamically change a level of │
│ security applicable to the workload │
│ from a first level of security to a │
│ second level of security, while the │
│ workload remains in an available │
│ state │
│                         904 │
└─────────────────────────────┘

FIG. 9

FIG. 10

DYNAMIC ALLOCATION OF A WORKLOAD ACROSS A PLURALITY OF CLOUDS

CROSS-REFERENCE TO RELATED APPLICATIONS

This application is a Continuation of U.S. application Ser. No. 13/441,526, filed on Apr. 6, 2012, the entirety of which is incorporated herein by reference.

BACKGROUND

One or more embodiments disclosed within this specification relate to cloud computing and, more particularly, to allocation of a workload in a cloud computing environment.

Cloud computing is a model of service delivery for enabling convenient, on-demand network access to a shared pool of configurable computing resources. In this regard, shared resources may be provided to computers and other devices as a utility over a network, such as a private network and/or a public network (e.g., the Internet). The resources can include computation/processing, software applications, data access, data management and data storage. End users need not know the specific location or other details of a cloud infrastructure. Nonetheless, end users can access cloud based applications through a web browser or a light weight desktop or mobile application, while business software and data can be stored in the cloud.

BRIEF SUMMARY

One or more embodiments disclosed within this specification relate to cloud computing and, more particularly, to allocation of a workload in a cloud computing environment. An embodiment can include a method of allocating cloud resources. The method can include presenting to a user interface configured to receive a user selection of a change of context for at least one of a plurality of workloads allocated to at least one cloud. The method further can include, responsive to receiving the user selection of the change of context for the workload, via a processor, dynamically changing a service level agreement applicable to the workload from a first service level agreement to a second service level agreement, while the workload remains in an available state.

Another embodiment can include a method of allocating cloud resources. The method can include presenting to a user interface configured to receive a user selection of a change of context for at least one of a plurality of workloads allocated to at least one cloud. The method further can include, responsive to receiving the user selection of the change of context for the workload, dynamically changing a level of security applicable to the workload from a first level of security to a second level of security, while the workload remains in an available state.

Another embodiment can include a system having a processor and memory. The processor can be configured to initiate executable operations and/or functions as described within this specification.

Another embodiment can include a computer program product for allocating cloud resources. The computer program product can include a computer-readable storage medium having stored thereon program code that, when executed, configures a processor to perform the various functions and/or operations described within this specification.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes. In this regard, the term "cloud," as used herein, means a computing infrastructure comprising a plurality of nodes interconnected via a suitable communication network and, from the perspective of a client, together appear as a single resource. Although the cloud appears to the client as a single resource, via the various nodes of the cloud, the cloud can provide to the client a myriad of different functions, such as data processing, data storage, services, applications, etc. By way of example, a cloud can appear to the client as a single server, though in actuality the cloud may comprise a plurality of servers, storage systems, networking components, services, applications, etc., as will be described herein.

As used herein, the term "virtual cloud" means an abstracted cloud level that federates and/or leverages a plurality of clouds interconnected via a suitable communication network and, from the perspective of a client, together appear as a single resource (e.g., as a single cloud). Although the virtual cloud appears as to the client as a single resource, via the various clouds, the virtual cloud can provide to the client a variety of different service levels and/or security levels. By way of example, a virtual cloud can appear to the client as a single server, though in actuality the virtual cloud may comprise a plurality of clouds, each of which can provide a plurality of servers, storage systems, networking components, services, applications, etc.

Figure 1:
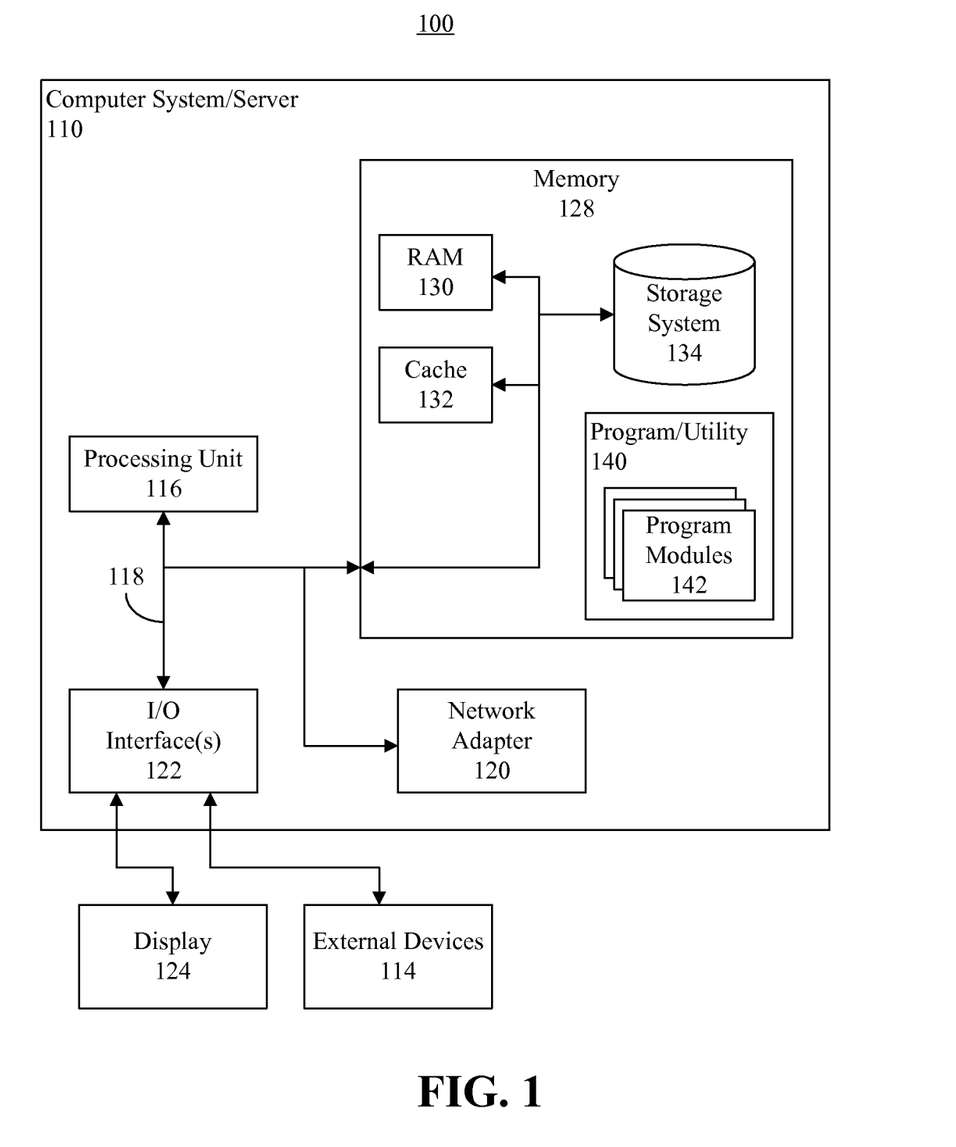
FIG. 1 is a block diagram illustrating a computer system/server of a cloud computing node in accordance with one embodiment of the present invention.

Referring now to FIG. 1, a block diagram of an example of a cloud computing node is shown. The cloud computing node 100 is only one example of a suitable cloud computing node and is not intended to suggest any limitation as to the scope of use or functionality of embodiments of the invention described herein. Regardless, the cloud computing node 100 is capable of being implemented and/or performing any of the functionality set forth hereinabove.

The cloud computing node 100 can include a processing system/server 110, which is operational with numerous other general purpose or special purpose computing system environments or configurations. Examples of well-known computing systems, environments, and/or configurations that may be suitable for use with processing system/server 110 include, but are not limited to, personal computer systems, server computer systems, control nodes, storage area network (SAN) controllers, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The processing system/server 110 may be described in the general context of computer system executable instructions, such as program modules, being executed by a computer system or other processing system. Generally, program modules may include routines, programs, objects, components, logic, data structures, and so on that perform particular tasks or implement particular abstract data types. The processing system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the processing system/server 110 in the cloud computing node 100 is shown in the form of a general-purpose computing device. The components of the processing system/server 110 may include, but are not limited to, one or more processors or processing units 116, a system memory 128, and a bus 118 that couples various system components including system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The processing system/server 110 typically may include a variety of computer-readable storage media. Such media may be any available media that is accessible by the processing system/server 110, and it includes both volatile and non-volatile media, removable and non-removable media. System memory 128 can include computer-readable storage media in the form of local memory (e.g., volatile memory), such as random access memory (RAM) 130 and/or cache memory 132. The processing system/server 110 may further include other removable/non-removable, volatile/non-volatile computer-readable storage media. By way of example only, a storage system 134 can be provided for reading from and writing to at least one non-volatile computer-readable storage media. Examples of computer-readable storage media can include, but are not limited to, a data storage device that comprises non-volatile magnetic media (e.g., a "hard disk drive" or "HDD"), a data storage device that comprises non-volatile solid state media (e.g., a "solid state drive" or "SSD"), a data storage device that comprises non-volatile magneto-optical media, and the like. Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM or other optical media, a solid state drive for reading from or writing to a removable, non-volatile, solid state drive can be provided. In such instances, each can be connected to the bus 118 by one or more data media interfaces, such as a fiber channel interface, a serial advanced technology attachment (SATA) interface, fiber channel interface, a small computer system interface (SCSI) interface, a serial attached SCSI (SAS) interface, or the like.

The memory 128 may include at least one computer program product that includes a computer-readable storage medium having computer-readable program code embodied therewith. The "computer-readable storage medium" can be non-transitory in nature. The computer-readable program code can include a set (e.g., at least one) of program modules 142 that are configured to carry out the functions of embodiments of the invention. The program/utility 140, having a set (at least one) of program modules 142, may be stored in the memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

The processing system/server 110 may also communicate with one or more external devices 114 such as a keyboard, a pointing device, a display 124, etc.; one or more devices that enable a user to interact with processing system/server 110; and/or any devices (e.g., network card, modem, etc.) that enable processing system/server 110 to communicate with one or more other computing devices. Such communication can occur via Input/Output (I/O) interfaces 122. Still yet, the processing system/server 110 can communicate with one or more networks such as a local area network (LAN), a general wide area network (WAN), and/or a public network (e.g., the Internet) via network adapter 120. As depicted, the network adapter 120 can communicate with the other components of the processing system/server 110 via the bus 118. It should be understood that although not shown, other hardware and/or software components could be used in conjunction with the processing system/server 110. Examples, include, but are not limited to: microcode, device drivers, redundant processing units, external disk drive arrays, RAID systems, tape drives, and data archival storage systems, etc.

Figure 2:
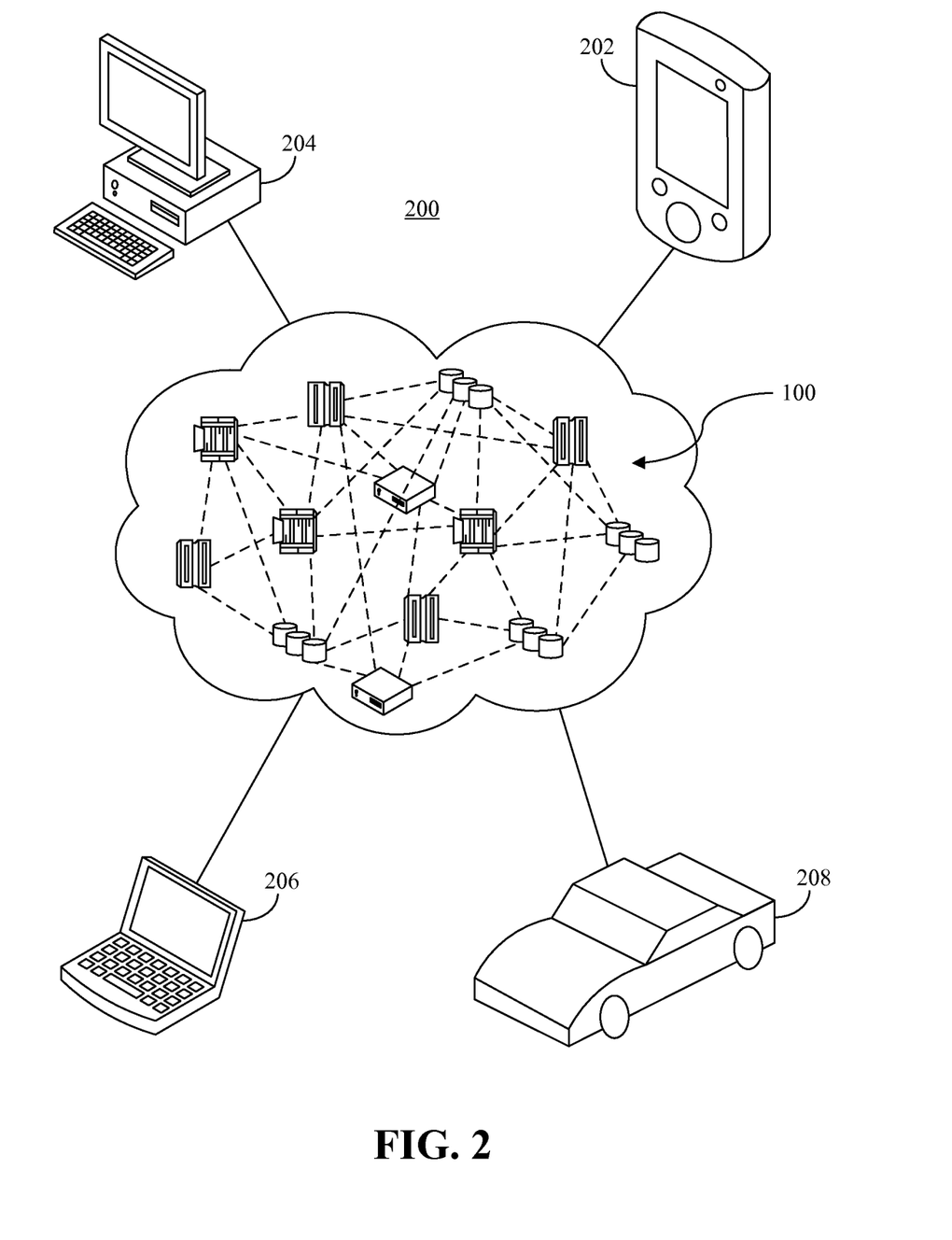
FIG. 2 depicts a cloud computing environment in accordance with one embodiment of the present invention.

Referring now to FIG. 2, an illustrative cloud computing environment 200 is depicted. As shown, the cloud computing environment 200 comprises one or more cloud computing nodes 100 with which local computing devices used by cloud consumers, such as, for example, a personal digital assistant (PDA) or cellular telephone 202, a desktop computer (or workstation) 204, a laptop computer 206, and/or an automobile computer system 208 may communicate. The computing nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 202-208 shown in FIG. 2 are intended to be illustrative only and that the computing nodes 100 and cloud computing environment 200 can communicate with any type of computerized device over any type of network and/or network addressable connection (e.g., using a web browser).

Figure 3:
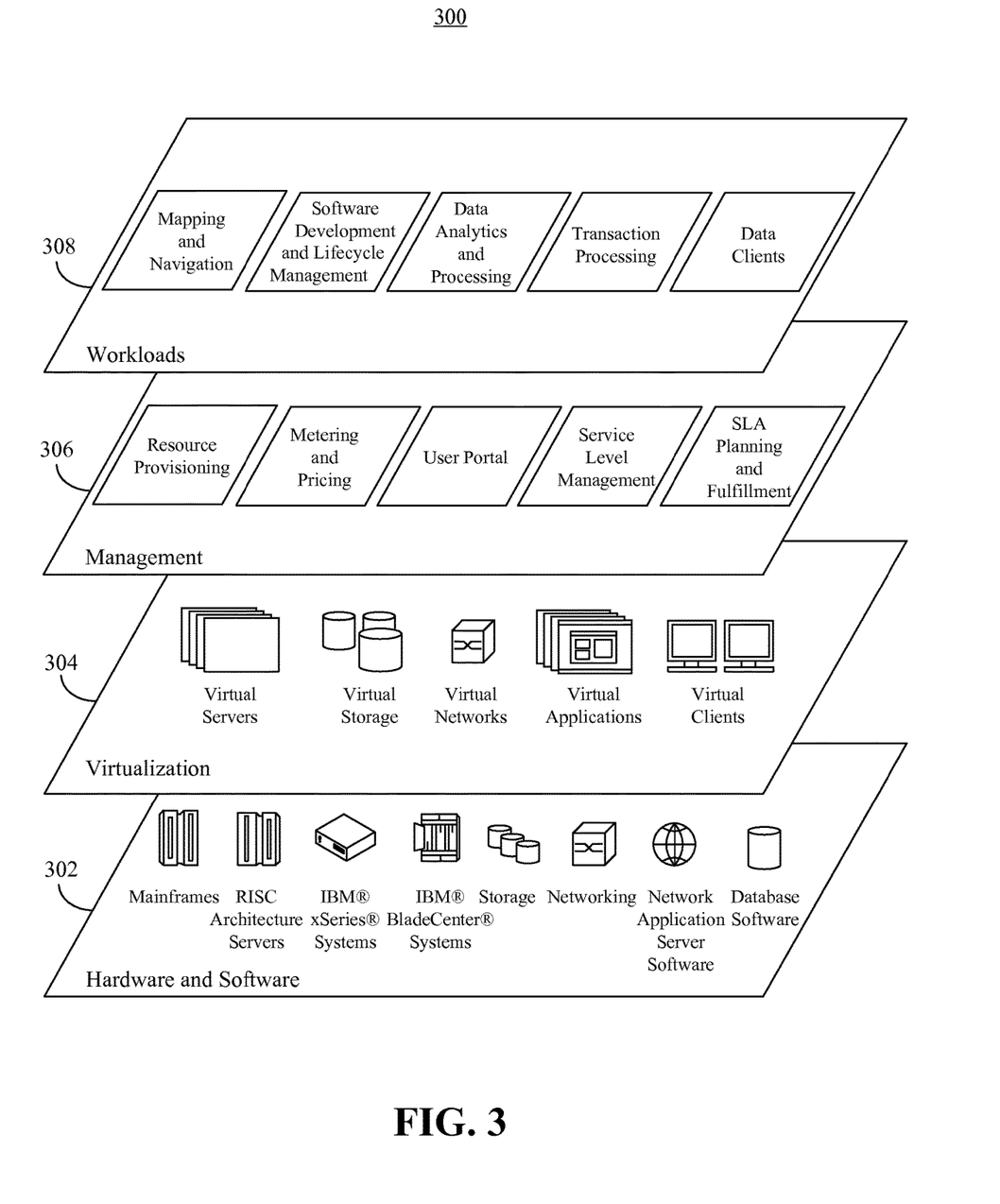
FIG. 3 depicts functional abstraction layers provided by cloud computing environment in accordance with one embodiment of the present invention.

Referring now to FIG. 3, a set 300 of functional abstraction layers provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 302 can include hardware and software components. Examples of hardware components include, but are not limited to, mainframes, in one example IBM® zSeries® systems; RISC (Reduced Instruction Set Computer) architecture based servers, in one example IBM pSeries® systems; IBM xSeries® systems; IBM BladeCenter® systems; storage systems (e.g., storage arrays, network attached storages (NASs), and the like); and networking components. Networking components can include any of a variety of routers, switches, network adapters, and the like.

Examples of software components include network application server software, in one example IBM WebSphere® application server software; and RAID array control software, in one example IBM SAN volume controller, which can execute on an IBM SVC Storage Engine. (IBM, zSeries, pSeries, xSeries, BladeCenter, WebSphere, and DB2 are trademarks of International Business Machines Corporation registered in many jurisdictions worldwide). The software components also may include database software which contains data related to the configuration of the cloud computing environment.

A virtualization layer 304 can provide an abstraction layer from which the following examples of virtual entities may be provided: virtual servers; virtual storage; virtual networks, including virtual private networks; virtual applications and operating systems; and virtual clients.

In one example, a management layer 306 may provide the functions described below. Resource provisioning provides dynamic procurement of computing resources and other resources that are utilized to perform tasks within the cloud computing environment. Storage management manages the virtual storage within the cloud computing environment. The user portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 308 can provide workloads for which the cloud computing environment may be utilized. Examples of workloads and functions which may be provided from this layer may include, but are not limited to, mapping and navigation, software development and lifecycle management, data analytics processing, transaction processing, and data clients. Still, the workloads layer 308 can include any other applications and/or workloads suitable to be deployed in a cloud computing environment, and the invention is not limited in this regard.

Figure 4:
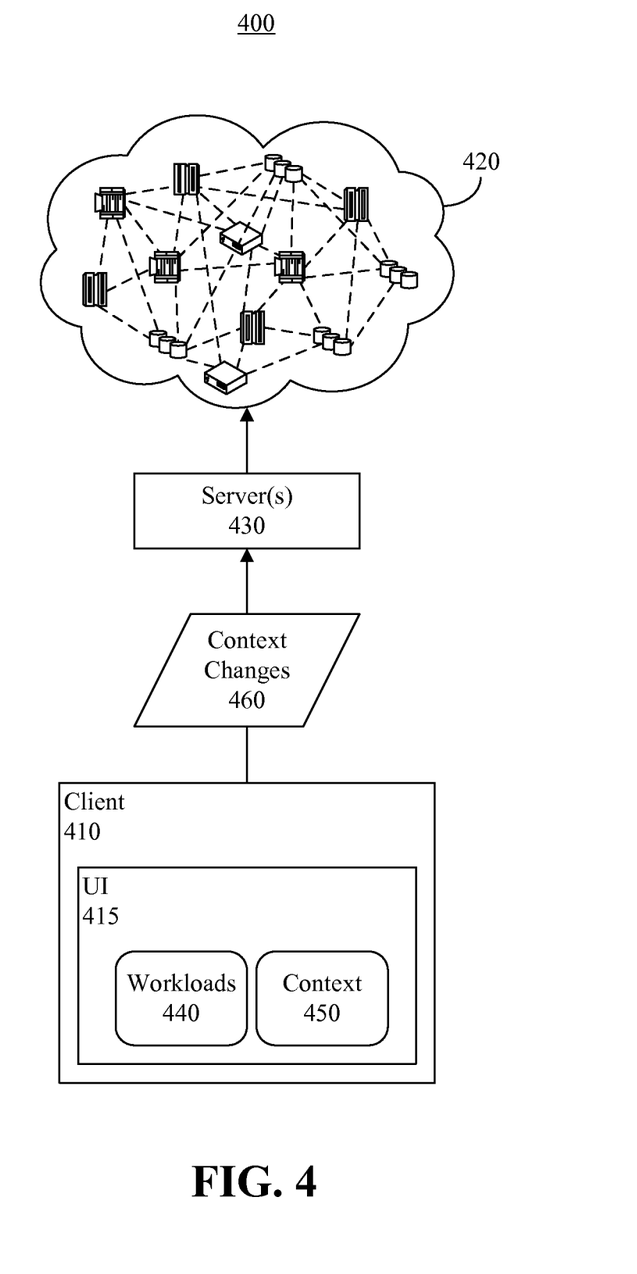
FIG. 4 depicts a system in accordance with another embodiment of the present invention.

FIG. 4 depicts a system 400 in accordance with another embodiment of the present invention. The system 400 can include a client 410 communicatively linked to a cloud 420, for example via a processing system comprising at least one processor and at least one memory, such as a server 430. In this regard, the server 430 can implemented in accordance with the description of the processing system/server 110 of FIG. 1, and the processor/memory can be configured to perform the functions described herein as being performed by the server 430.

In one embodiment, a server 430 can be communicatively linked to the cloud 420 (or a virtual cloud), via a suitable communication network, for example a public network, such as the Internet, and/or a private network, such as a local area network (LAN) a wide area network (WAN), or the like. In another embodiment, a server 430 can be a node within the cloud 420, a node within another cloud, or a node within a virtual cloud. Further, one or more servers 430 can be tasked with performing the functions described herein as being performed by the "server" 430. Regardless of whether the server(s) 430 is a cloud note or are cloud nodes, the client 410 can be communicatively linked to the server(s) 430 via a public network and/or a private network. For simplicity, the remainder of the specification will refer to the server 430, though it will be understood by those skilled in the art that a plurality of servers 430 can be used.

As used herein, the term "client" means a processing device or system, such as a workstation, desktop computer, mobile computer, tablet computer or the like that resides client-side in a client/server(s) relationship. In this regard, the client 410 can include at least one processor and memory configured to perform the methods described herein as being performed by the client 410. The client 410 further can include other components/devices and/or peripherals, as would be understood by one skilled in the art. For example, the client 410 can include a suitable display (not shown), incorporated into the client 410, or otherwise communicatively linked to the client.

In one arrangement, the user interface 415 can be visually presented by the client 410 on the display. The user interface 415 can be configured to present on the display one or more workloads and receive one or more user inputs to change a service level agreement of at least one of the workloads. In another arrangement, the user interface 415 can be presented by the client using a text-to-speech application that generates output audio signals related to the user interface 415 via a suitable output audio transducer embodied within the client 410 and/or coupled to the client 410 as a peripheral device. In such arrangement, the user interface 415 can receive audible user inputs (e.g., spoken utterances) via a microphone within the client 410 and/or coupled to the client 410 as a peripheral device. As used herein, the term "workload" means a unit of work to be performed by one or more computing resources. Such computing resources may be provided by a cloud. Accordingly, a workload also may be referred to as a "cloud asset."

The server 430 can host a user portal (or client portal) via which the client 410 can interface with the server 430 to provide to present a list of one or more workloads 440 allocated to the cloud 420 or the virtual cloud, and present context for service level agreements related to such workloads 440. The workloads 440 can be workloads that are associated with the client 410, or a user (e.g., person) who is logged into the client 410. In illustration, the user can be an administrator tasked with managing certain workloads 440 (e.g., via user name/password or other suitable association), and when the user interface 115 is presented by the client 410, such workloads 440 and corresponding context 450 for service level agreements and/or security levels can be presented by the user interface 225 at the behest of the user.

Figure 5:
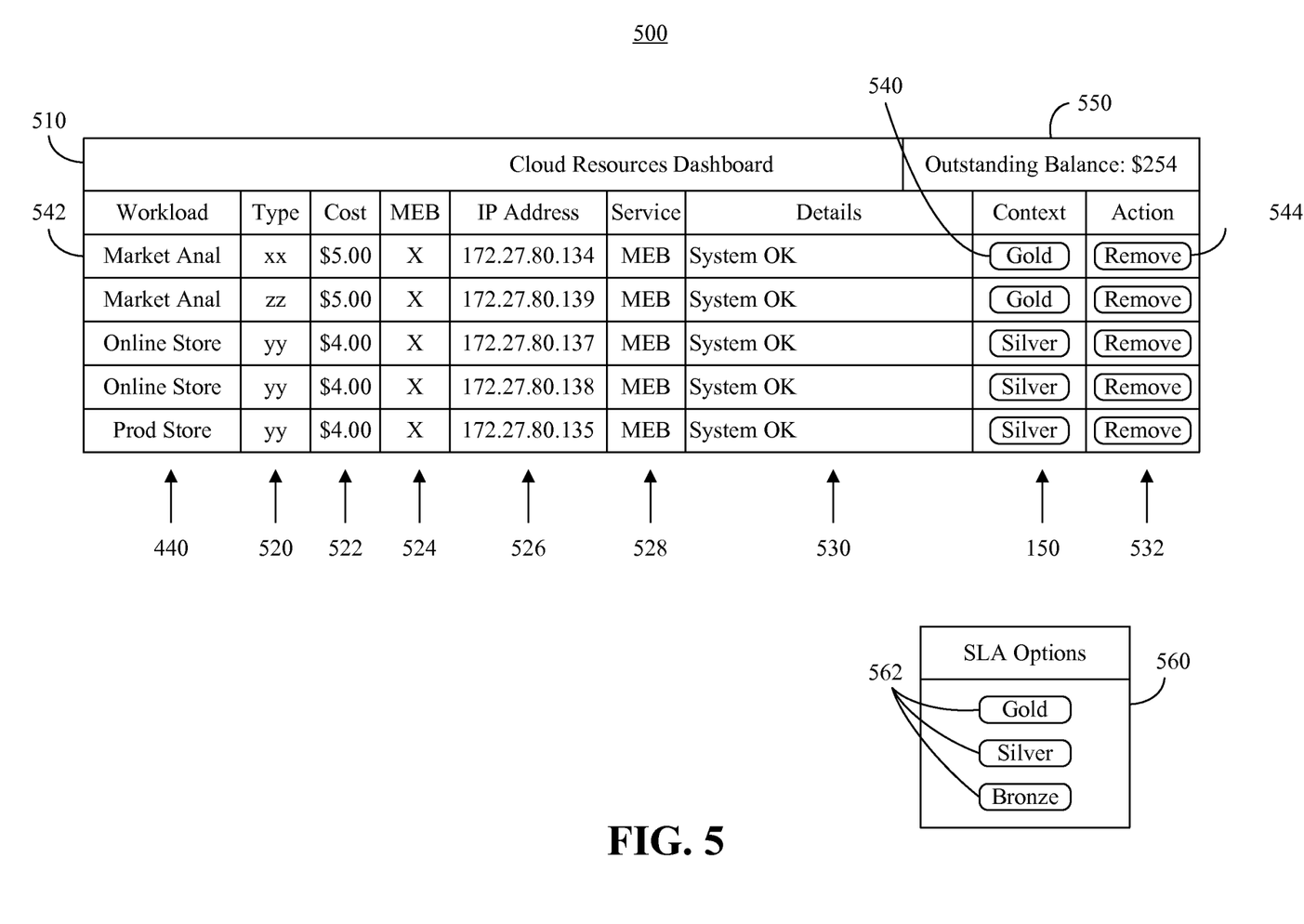
FIG. 5 depicts a view of a user interface in accordance with another embodiment of the present invention.

FIG. 5 depicts a view 500 of a user interface in accordance with another embodiment of the present invention. The view 500 can be presented by the user interface 415 of FIG. 4. The view 500 or the user interface 415 and the view 500 can be communicated to the client 410 via the server 430 or another suitable node of the cloud 420. The view 500 can present a listing of present the workloads 440 and context 450 for the service level agreements associated with such workloads 440, for example in a dashboard 510 visually depicted on the display or otherwise presented by the user interface. In illustration, the contexts 450 can indicate one or more workloads and a present level of service provided for each of the workloads 440 by one or more clouds.

The dashboard 510 also can present, for each workload 440, a field 520 associated with the workload 440 that indicates the workload type, a cost 522 associated with the service provided to the workload (e.g., based on the service level agreement associated with the workload), an indicator 524 that indicates whether the workload 440 is associated with a managed environment broker, an IP address 426 associated with the service to which the workload 440 is allocated, an indicator 528 of the service provider that provides service for the workload 440, details 430 related to the present status of the workload 440 (e.g., whether the workload is functioning normally, whether a fault is encountered, and so on), a context 150 for the workload 440 (e.g., the service level agreement applicable to the workload 440), and actions 532 that may be performed related to allocation of the workload 440 to a present service.

The contexts 150 can be indicated in a manner in which the contexts 150 each are associated with a user selectable button or icon which, when selected, enables the user to change the context 150 of the workload 542. For instance, the user can select a button or icon 540 to change the context 150 for a workload 542, thus requesting a change in a service level agreement implemented for the workload 542 by the cloud or virtual cloud. In one non-limiting example, the user can select the button or icon 540 to present a menu 560 of selectable service level agreements 562, and the user can select a desired service level agreement 562 from this menu 560. Still, the user can change the contexts 150 in any other suitable manner and the invention is not limited in this regard. Further, the user can select a user selectable button or icon 544 to remove the workload 542 from the cloud or virtual cloud if the user desires that the workload 542 no longer be allocated to the cloud or virtual cloud.

The user may consider the price of services that satisfy the various service level agreements and/or security levels when determining whether to change the context for a particular workload 440. Moreover, the user may consider an outstanding balance owed to one or more service providers. Accordingly, the dashboard 510 further can include a field 550 that indicates a current outstanding balance of fees owed for use of the cloud or virtual cloud to exercise the workloads 440. The current outstanding balance can include fees currently due, fees past due, etc. The field 550 can be configured to be user selectable. When selected, a listing (not shown) can be presented indicating individual fees and the workloads and/or services to which the individual fees apply.

The dashboard 510 also can present options (not shown) to allow the user to schedule context changes for various workloads. For example, for a particular workload 440, the user can schedule a first context applicable to the workload 440 at certain time/days/weeks, etc., and a second context applicable to the workload 440 at other time/days/weeks, etc.

Referring both to FIG. 4 and FIG. 5, when the user selects to change the context 150 of one or more particular workloads 440 via the user interface 415, for example by selecting the button or icon 540 and selecting a desired service level agreement 562, the client 410 can communicate to the server 430 a context change 460 for an associated workload 440. Further, the user can change the context of one or more additional workloads in a suitable manner, if desired, and context changes 460 for the associated workloads 440 can be communicated to the server 430.

Referring to FIG. 4, in response, to the user selecting a change of context, the context changes 460 can be communicated from the client to the server 430, and the server 430 can change the service level agreement(s) and/or security levels implemented for such workload(s) 440. For example, for a particular workload 440, the service level agreement can be changed from a first service level agreement to a second service level agreement, and or the security level can be changed from a first level of security to a second level of security. Notably, the workloads 440 can remain active while the changes in service level agreements/security levels are implemented. In other words, services provided by and/or for the workloads 440 need not be stopped to implement a change in service level agreement and/or security level indicated by the context changes 460.

The workloads 440 may comprise one or more deployment units. As used herein, the term "deployment unit" means an asset of a workload. In illustration, a deployment unit 412 can be an executable application, process or function, cohesive data, or the like. In illustration, the workload 440 can include a deployment unit 412 that is an executable application, and a deployment unit 412 that comprises data executed by the application, for example one or more data tables. The invention is not limited to these specific examples, however. As discussed herein, various embodiments of reallocating workloads are discussed. These embodiments also can include reallocating deployment units. For instance, a particular deployment unit of a workload 440 can be allocated to a particular node of a cloud, or host, while another deployment of the workload 440 can be allocated to another node of a cloud, or host. Accordingly, when reviewing the following description, it will be understood that when a workload is described as being reallocated, a particular deployment unit of the workload can be reallocated, while other deployment units need not be reallocated, or can be reallocated to different nodes or hosts. In this regard, the term "workload" is used in the following description and in the claims that follow as a general term that covers a plurality of deployment units of a workload and a single deployment unit of a workload, though the workload may comprise other deployment units that are not reallocated or reallocated in a different manner.

The service level agreement changes and/or security level changes can be implemented in any suitable manner. For example, for a particular workload 440, the cloud 420 (or virtual cloud) can dynamically reallocate the workload 440 from a first server to a second server within the cloud or virtual cloud. The first and/or second servers can be respective machines, for example respective nodes within one or more clouds, or virtual servers.

As used herein, the term "virtual server" means a virtual machine executing a suitable server operating system. A virtual machine is an isolated guest operating system installation within a normal host operating system. For example, an operating system may host one or more virtual servers. Nonetheless, each virtual server may function independently of other virtual servers that may be hosted on by the operating system. Virtual servers are well known in the art.

To dynamically reallocate the workload 440 from the first server to the second server, in one embodiment, data of the workload 440 can be moved from local memory allocated to the first server to local memory allocated to the second server. For example, if the servers are individual machines, respectively, the data can be moved from a first machine's local memory to a second machine's local memory. If the servers are virtual servers executing on the same machine, the data can be moved from memory allocated to the first virtual server to memory allocated to the second virtual server. Notably, movement of data from a first local memory to a second local memory can be implemented very quickly. Accordingly, an end user or process that is accessing the workload may not be aware that the workload has been reallocated. Nonetheless, if the workload is reallocated to a server that provides a higher level of service or different level of security, the end user or process may notice improved performance (e.g., faster processing times, higher input/output bandwidth, lower latency, lower jitter, higher mean time between failures, lower mean time to repair, lower mean time to recovery, etc.) or a different level of security being implemented.

In another embodiment, to dynamically reallocate the workload 440 from the first server to the second server, the data of the workload can be moved from a first computer-readable storage medium allocated to the first server to a second computer-readable storage medium allocated to the second server. Moving the data from one storage medium to another may entail moving the data from one physical storage device or array to another, or moving the data from one partition in a storage device or array to another partition of the storage device or array. Moving the data from one storage medium to another can change the performance related to data transfer, though this need not be the case. For example, a particular storage medium may provide improved input/output bandwidth and/or latency compared to another storage medium.

In another embodiment, to dynamically reallocate the workload 440 from the first server to the second server, a pointer to the data of the workload 440 (e.g., the computer-readable storage on which the data is stored) can be added to the second server receiving the workload 440, while a pointer to the data of the workload 440 can be removed from the first server from which the workload 440 is being reallocated.

The first and second servers may be contained in the same cloud 420, or may be contained in different clouds. In this regard, the first and second servers can be defined within respective clouds, and the respective clouds both can be defined within a virtual cloud.

The context changes 460 can cause a particular workload 440 to be reallocated from a first server to a second server for any number of reasons. For example, when a context change 460 for a workload 440 is implemented, the first server to which the workload 440 is allocated, and the service level agreement provided by that server can be identified. If the service level agreement provided by that server does not satisfy the new service level agreement indicated by the context change 460, a new server that complies with the new service level agreement can be identified and the workload 440 can be transferred to that new server.

If the service level agreement provided by the present server does satisfy the new service level agreement identified in the context change 460, in response to the context changes 460, the server can change the level of service that the server provides to the workload 440. In another embodiment, the server can be automatically re-configured to comply with the indicated level of service. For example, at least one other workload on server can be reallocated from the server to another server to reduce a total number of workloads allocated to the server.

In a further embodiment, for a particular workload 440, the context change 460 can indicate that a first service level and/or security level is to be provided to the workload 440 at a particular time, while a second service level and/or security level is to be provided to the workload 440 at a another time. For example, a first service level may be required during normal business hours, while a second service level may be required at other times, for instance during evenings and weekends. Accordingly, the server 430 can dynamically choose which server within the cloud 420 (or virtual cloud) is to host the workload 440 at the respective times based on the service level agreements with which the respective servers comply. For instance, at a first time, the server 430 can dynamically move the workload 440 from a first server to a second server and, at a second time, dynamically move the workload from the second server either back to the first server, or to another server that complies with a service level agreement that satisfies the context 450 at the second time.

Figure 6:
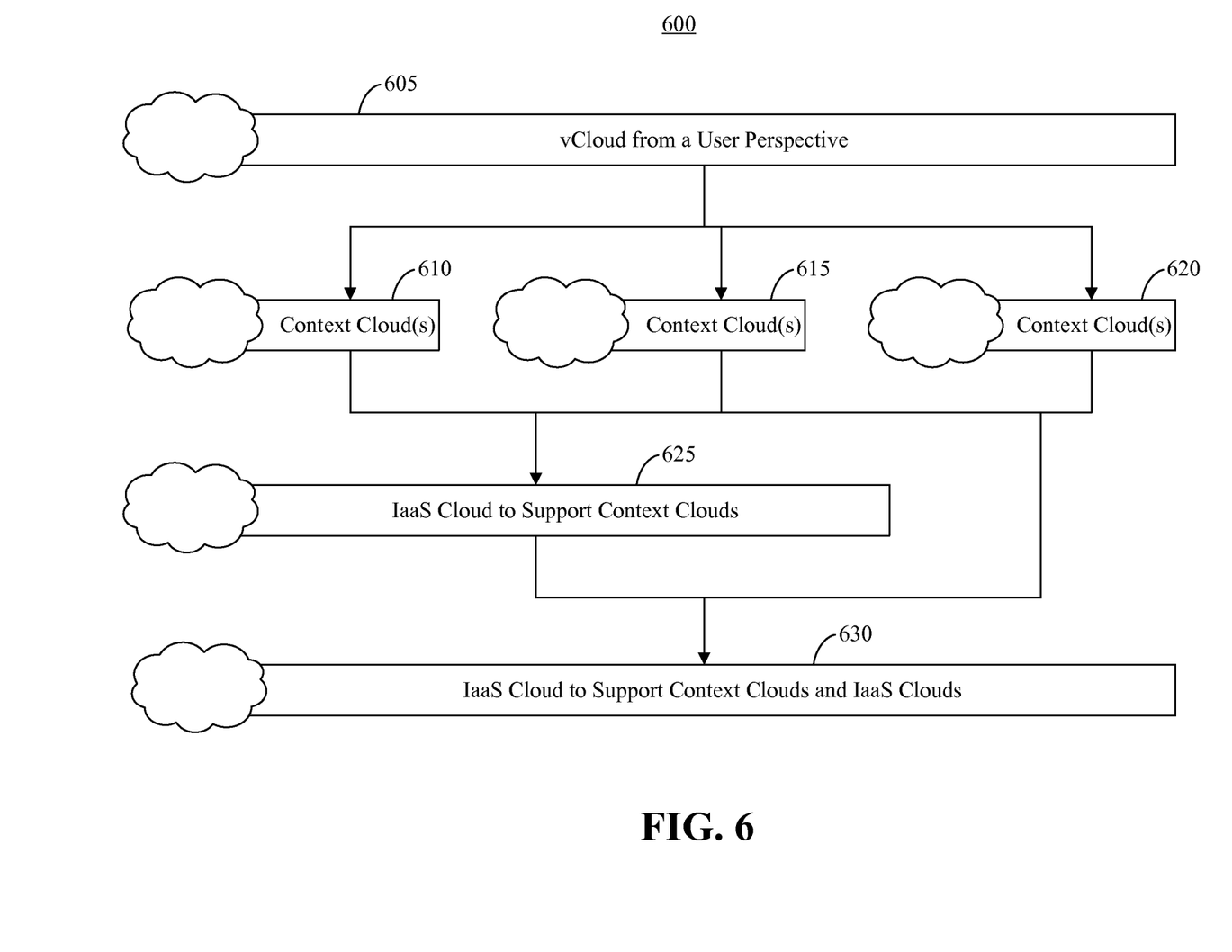
FIG. 6 is a diagram illustrating of relationships between various layers of clouds in accordance with another embodiment of the present invention.

FIG. 6 is a diagram 600 illustrating relationships between various layers of clouds in accordance with another embodiment of the present invention. The diagram 600 depicts a virtual cloud (vCloud) 605 from a user perspective, context clouds 610, 615, 620, an Infrastructure as a Service (IaaS) cloud 625 that supports the context cloud(s) 610-620, and an IaaS cloud 630 that supports the context clouds 610-620 and the IaaS cloud 625. The context clouds 610 can be defined within the IaaS cloud 625 and/or the IaaS cloud 630, for example as sub-clouds, though this need not be the case.

From the user perspective, the user perceives the context clouds 610-620 and the IaaS clouds 625-630 as the vCloud 605. For example, the user can be presented a conventional cloud interface. Accordingly, the user can specify context/service level requirements for various workloads without being concerned with where workloads are allocated, or how the workloads are allocated.

The context clouds 610-620 each can control access to respective services provided to the workloads based on the service level agreements applicable to the contexts of the respective workloads and security requirements for the respective workloads, both of which can be indicated by the respective workload contexts. The context cloud(s) 610 can control access a gold service level/security, the context cloud(s) 615 can control access a silver service level/security, and the context cloud(s) 620 can control access a bronze service level/security. In illustration, the context clouds 610-620 can access a service catalog linked to the IaaS clouds 625, 630, and that indicates the service level agreements and/or security levels to which various resources in the IaaS clouds 625, 630 comply.

The IaaS cloud 625 can be configured to support the context clouds 610-620. In this regard, the context of the workloads can be mapped against the IaaS cloud 625. For example, operating systems, processes or services executing within the IaaS cloud 625 can process executable workloads. The context clouds 610-620 can reallocate workloads among various resources in the IaaS clouds 625, 630, as may be required, by context changes.

The IaaS cloud 630 can be a storage cloud where images of the operating systems/processes/services are stored for use by the IaaS cloud 625. The IaaS cloud 630 further can store contexts accessed by the context clouds 610-620 for the various workloads. The context clouds 610-620 can interface with the IaaS cloud 630 to move, update and remove contexts. The IaaS cloud 630 further can store the service catalog, the corresponding service level agreements, and/or the corresponding security requirements. In this regard, the context clouds 610-620 can access such information from the IaaS cloud 630.

Figure 7:
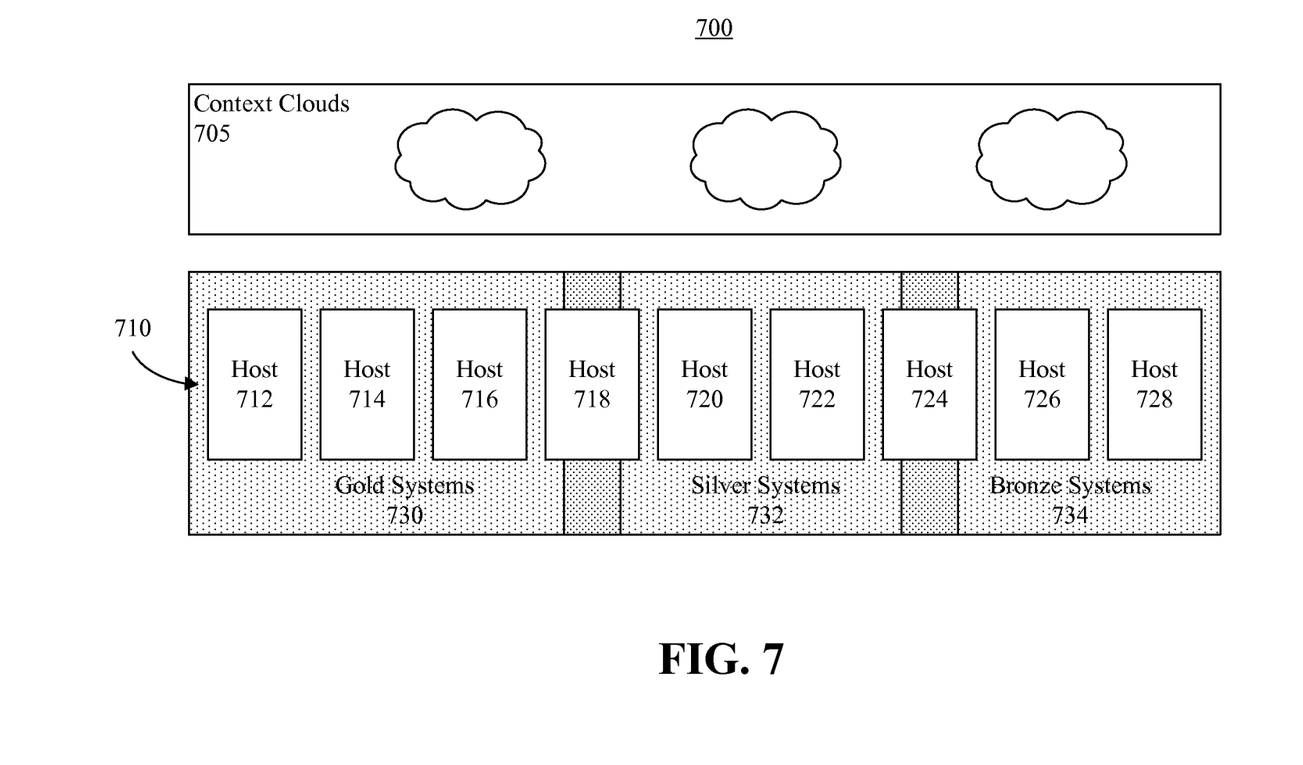
FIG. 7 is a diagram illustrating relationships between context clouds and resources allocated to the context clouds in accordance with another embodiment of the present invention.

FIG. 7 is a diagram 700 illustrating relationships between context clouds 705 and resources 710 allocated for use by the context clouds 705 in accordance with another embodiment of the present invention. The resources 710 can include a plurality of hosts 712, 714, 716, 718, 720, 722, 724, 726, 728 and one or more storage clouds. The hosts 712 can be any suitable nodes within one or more clouds, including, but not limited to, processing resources, memory resources, storage resources, networking resources, and the like.

The hosts 712-716 can be allocated to provide gold level services and, as such, can be referred to as gold systems 730. The hosts 720-722 can be allocated to provide silver level services and, as such, can be referred to as silver systems 732. The hosts 726-728 can be allocated to provide bronze level services and, as such, can be referred to as bronze systems 734. The host 718 can be dynamically configured to provide gold level services, silver level services and/or a combination of gold and silver level services. The host 724 can be dynamically configured to provide silver level services, bronze level services and/or a combination of silver and bronze level services.

In illustration, when the hosts 712-716 provide sufficient resources to properly handle the workload requirements for all workloads requiring gold level service, the host 718 can be allocated to provide silver level services. If, however, the hosts 712-716 become heavily loaded, creating a risk that they may not be able to properly satisfy gold level service level agreements and/or security requirements, the host 718 can be allocated to provide gold level service to increase gold level workload capacity. In the case that the host 718 presently is lightly loaded, it may not be necessary to reallocate silver level workloads from the host 718. If, however, the host is heavily loaded, then at least a portion of the silver level workloads can be reallocated from the host 718 to the hosts 720-722. Similarly, silver level workloads can be reallocated from the hosts 718-720 to the host 724 if warranted by silver level workload conditions.

Further, if the host 718 is providing gold level service, and the hosts 720-722 become heavily loaded, silver level workloads can be reallocated from the hosts 720-722 to the host 718. Similarly, if the host 724 is providing silver level service, and the hosts 726-728 become heavily loaded, bronze level workloads can be reallocated from the hosts 726-728 to the host 724.

Further, additional hosts can be dynamically allocated to serve as gold systems 730, silver systems 732 and/or bronze systems 734 to satisfy workload demands. Such hosts can be nodes within a same cloud as one or more of the hosts 712-728, or nodes of one or more different clouds. Notwithstanding, once allocated, services provided by the additional hosts can be perceived by the user as being part of the same virtual cloud comprising the hosts 712-128.

Figure 8:
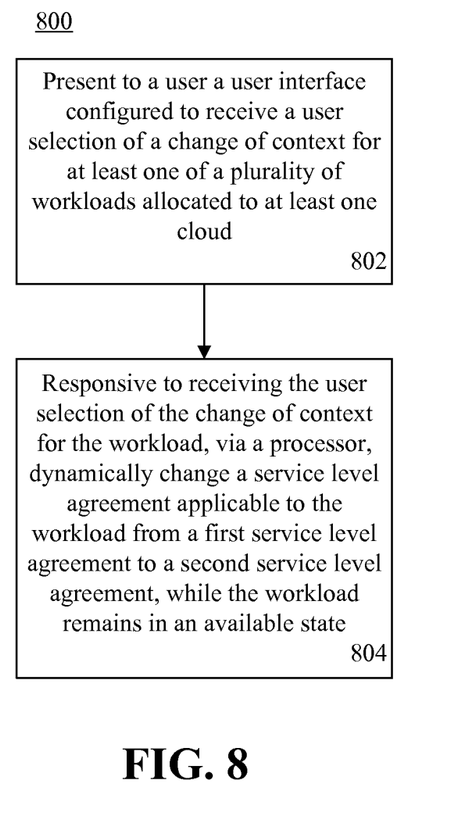
FIG. 8 is a flow chart illustrating a method of allocating cloud resources in accordance with another embodiment of the present invention.

FIG. 8 is a flow chart illustrating a method 800 of allocating cloud resources in accordance with another embodiment of the present invention. At step 802, a user interface can be presented to a user. The user interface can be configured to receive a user selection of a change of context for at least one of a plurality of workloads allocated to at least one cloud. At step 804, responsive to receiving the user selection of the change of context for the workload, via a processor, a service level agreement applicable to the workload can be dynamically changed from a first service level agreement to a second service level agreement, while the workload remains in an available state.

Figure 9:
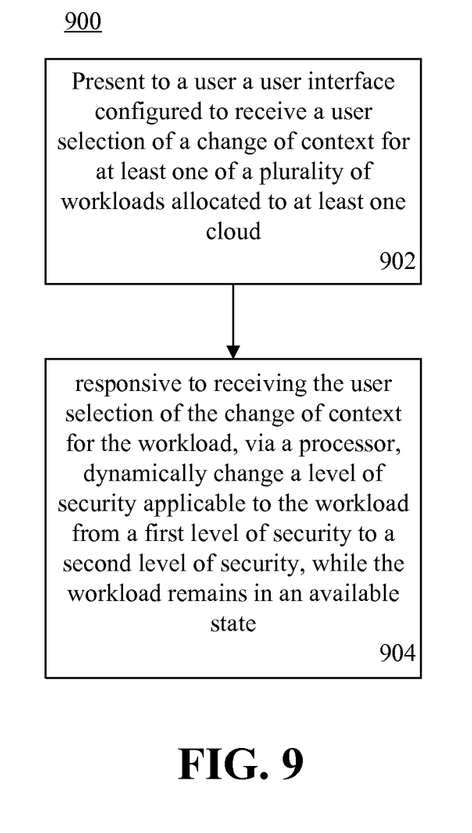
FIG. 9 is a flow chart illustrating a method of allocating cloud resources in accordance with another embodiment of the present invention.

FIG. 9 is a flow chart illustrating a method 900 of allocating cloud resources in accordance with another embodiment of the present invention. At step 902, a user interface can be presented to a user. The user interface can be configured to receive a user selection of a change of context for at least one of a plurality of workloads allocated to at least one cloud. At step 904, responsive to receiving the user selection of the change of context for the workload, via a processor, a security level applicable to the workload can be dynamically changed from a first security level to a second security level, while the workload remains in an available state.

Figure 10:
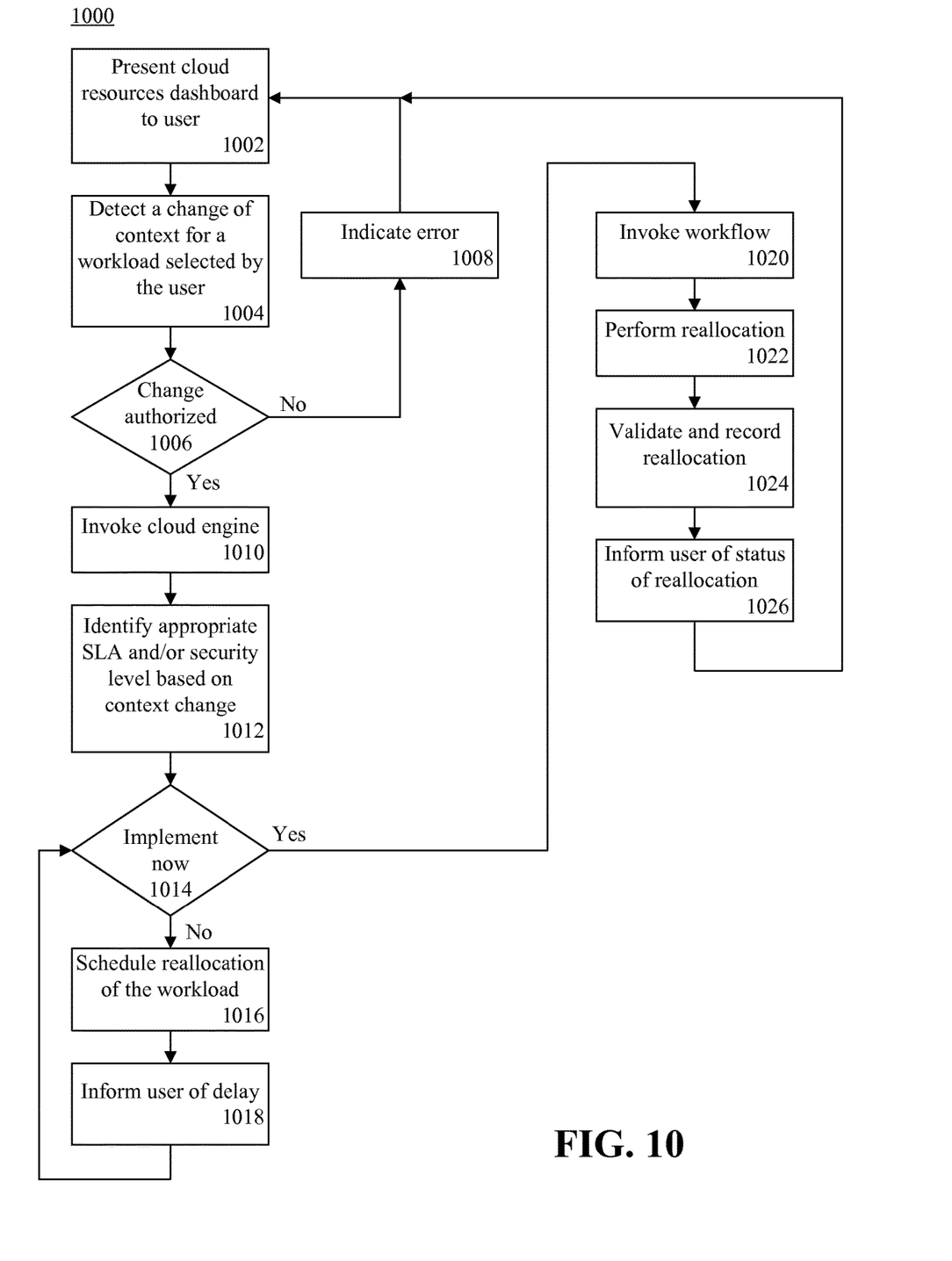
FIG. 10 is a flow chart illustrating a method of allocating cloud resources in accordance with another embodiment of the present invention.

FIG. 10 is a flow chart illustrating a method 1000 of allocating cloud resources in accordance with another embodiment of the present invention. At step 1002, a cloud resources dashboard can be presented to a user. At step 1004, a change of context for a workload selected by a user can be detected. At decision box 1006, a determination can be made whether the change is authorized. If not, at step 1008 an error can be indicated to the user. For example, an error message can be presented via the user interface indicating to the user that the change is not authorized.

At step 1010, if the change is authorized, a cloud engine can be invoked to perform reallocation of the workload. At step 1012, based on the context change, an appropriate service level agreement and/or security level can be identified. At decision box 1014, a determination can be made as to whether reallocation should be implemented now. For example, a determination can be made as to whether resources are presently available to receive allocation, whether the workload can be seamlessly reallocated at the present time, etc. If reallocation should not be implemented now, at step 1016 the reallocation can be scheduled. At step 1018 the user can be informed of the delay. At the scheduled time, the process can return to decision box 1014.

Referring again to decision box 1014, if the reallocation is to be implemented now, at step 1020 a workflow can be implemented to begin the reallocation process. At step 1022 reallocation of the workload can be performed. At step 1024 the reallocation can be validated and recorded. For example, the validation can be recorded to a service catalog that tracks workload allocations. At step 1026, the user can be informed of the status of the reallocation. The process then can return to step 1002 to receive additional context changes that the user may wish to implement.

Like numbers have been used to refer to the same items throughout this specification. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "include" and/or "including," when used in this specification, specify the presence of stated features, integers, steps, operations, elements, and/or components, but do not preclude the presence or addition of one or more other features, integers, steps, operations, elements, components, and/or groups thereof. Moreover, as used herein, ordinal terms (e.g. first, second, third, fourth, fifth, and so on) distinguish one cloud, server, memory, storage medium, context, service level agreement, security level or the like from another. Thus, an ordinal term used herein need not indicate a specific position in an ordinal series or hierarchy.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of allocating cloud resources, comprising:
presenting a user interface configured to receive a user selection of a change of context for at least one of a plurality of workloads deployed in a cloud computing environment;
responsive to receiving the user selection of the change of context for the workload, via a processor, dynamically changing a level of security applicable to the workload from a first level of security to a second level of security, while the workload remains in an available state, by dynamically changing a service level agreement applicable to the workload by scheduling reallocating the workload from a first server complying with the first level of security to a second server complying with the second level of security;
determining whether the second server is presently available to seamlessly receive reallocation of the workload from the first server; and
if the second server is presently available to seamlessly receive reallocation of the workload from the first server, automatically reallocating the workload from the first server to the second server, and if the second server is not presently available to seamlessly receive reallocation of the workload from the first server, automatically rescheduling reallocating the workload from the first server to the second server to occur at a later time.

2. A system, comprising:
a processor configured to initiate executable operations comprising:
presenting a user interface configured to receive a user selection of a change of context for at least one of a plurality of workloads allocated to at least one cloud; and
responsive to receiving the user selection of the change of context for the workload, via a processor, dynamically changing a service level agreement applicable to the workload from a first service level agreement to a second service level agreement, while the workload remains in an available state, by dynamically scheduling reallocating the workload from a first server complying with the first level of security to a second server complying with the second level of security;
determining whether the second server is presently available to seamlessly receive reallocation of the workload from the first server; and
if the second server is presently available to seamlessly receive reallocation of the workload from the first server, automatically reallocating the workload from the first server to the second server, and if the second server is not presently available to seamlessly receive reallocation of the workload from the first server, automatically rescheduling reallocating the workload from the first server to the second server to occur at a later time.

3. The system of claim 2, wherein:
the workload is an application deployed in a cloud computing environment; and dynamically reallocating the workload from the first server to the second server comprises:
moving data of the application from a first local memory allocated to the first server to second local memory allocated to the second server.

4. The system of claim 2, wherein:
the workload is an application deployed in a cloud computing environment; and dynamically reallocating the workload from the first server to the second server comprises:
moving data of the application from a first computer-readable storage medium allocated to the first server to a second computer-readable storage medium allocated to the second server.

5. The system of claim 2, wherein dynamically reallocating the workload from the first server to the second server comprises:
adding a pointer to the second server that points to a computer-readable storage medium on which data of the workload is stored; and removing a pointer from the first server that points to the computer-readable storage medium on which the data of the workload is stored.

6. The system of claim 2, wherein:
the workload is an application deployed in a cloud computing environment; and dynamically reallocating the workload from the first server to the second server comprises:
reallocating the application from a first cloud of a virtual cloud to a second cloud of the virtual cloud, wherein the first server is defined within the first cloud and the second server is defined within the second cloud.

7. The system of claim 2, wherein:
the context for the workload indicates the first service level agreement is applicable to the workload at a first time and the second service level agreement is applicable to the workload at a second time;
the workload is an application deployed in a cloud computing environment; and dynamically changing the service level agreement applicable to the workload from the first service level agreement to the second service level agreement, while the workload remains in an available state, comprises:
dynamically moving the application from a first server to a second server at the first time; and
dynamically moving the application from the second server to the first server at the second time.

8. A computer program product for allocating cloud resources, said computer program product comprising:
a computer-readable storage device, wherein the computer-readable storage device is not a transitory, propagating signal per se, having stored thereon program code that, when executed, configures a processor to perform executable operations comprising:
presenting a user interface configured to receive a user selection of a change of context for at least one of a plurality of workloads allocated to at least one cloud; and
responsive to receiving the user selection of the change of context for the workload, via a processor, dynamically changing a service level agreement applicable to the workload from a first service level agreement to a second service level agreement, while the workload remains in an available state, by dynamically scheduling reallocating the workload from a first server complying with the first level of security to a second server complying with the second level of security;
determining whether the second server is presently available to seamlessly receive reallocation of the workload from the first server; and
if the second server is presently available to seamlessly receive reallocation of the workload from the first server, automatically reallocating the workload from the first server to the second server, and if the second server is not presently available to seamlessly receive reallocation of the workload from the first server, automatically rescheduling reallocating the workload from the first server to the second server to occur at a later time.

9. The computer program product of claim 7, wherein:
the workload is an application deployed in a cloud computing environment; and dynamically reallocating the workload from the first server to the second server comprises:
moving data of the application from a first local memory allocated to the first server to second local memory allocated to the second server.

10. The computer program product of claim 7, wherein:
the workload is an application deployed in a cloud computing environment; and dynamically reallocating the workload from the first server to the second server comprises:
moving data of the application from a first computer-readable storage medium allocated to the first server to a second computer-readable storage medium allocated to the second server.

11. The computer program product of claim 7, wherein dynamically reallocating the workload from the first server to the second server comprises:
adding a pointer to the second server that points to a computer-readable storage medium on which data of the workload is stored; and
removing a pointer from the first server that points to the computer-readable storage medium on which the data of the workload is stored.

* * * * *